United States Patent
Yokoo et al.

(10) Patent No.: US 9,719,707 B2
(45) Date of Patent: Aug. 1, 2017

(54) AIR CONDITIONER FOR VEHICLE WITH DEFROSTER CONTROL

(75) Inventors: Yasuhiro Yokoo, Kariya (JP);
Terukazu Higuchi, Okazaki (JP);
Yoshinori Yanagimachi, Takahama (JP); Akira Umehara, Toyota (JP)

(73) Assignee: DENSO CORPORATION, Kariya, Aichi-pref (JP)

(*) Notice: Subject to any disclaimer, the term of this patent is extended or adjusted under 35 U.S.C. 154(b) by 1120 days.

(21) Appl. No.: 13/587,024

(22) Filed: Aug. 16, 2012

(65) Prior Publication Data
US 2013/0055746 A1 Mar. 7, 2013

(30) Foreign Application Priority Data
Sep. 5, 2011 (JP) .................. 2011-193162

(51) Int. Cl.
| F25B 27/00 | (2006.01) |
| F25D 21/06 | (2006.01) |
| F25B 29/00 | (2006.01) |
| F25B 13/00 | (2006.01) |
| F25D 21/00 | (2006.01) |

(Continued)

(52) U.S. Cl.
CPC ......... F25B 41/04 (2013.01); B60H 1/00785 (2013.01); B60H 1/00842 (2013.01); B60H 1/00849 (2013.01)

(58) Field of Classification Search
CPC ........ F25B 47/02; F25D 21/00; F25D 21/002; F25D 21/004; F25D 21/006; F25D 21/008
USPC ............... 62/238.1, 151, 156, 159, 158, 234
See application file for complete search history.

(56) References Cited

U.S. PATENT DOCUMENTS

| 5,299,431 A | 4/1994 | Iritani et al. |
| 5,544,493 A * | 8/1996 | Suzuki .................. B60H 1/321 62/133 |

(Continued)

FOREIGN PATENT DOCUMENTS

| JP | 2000-168339 | 6/2000 |
| JP | 2000-301928 | 10/2000 |

(Continued)

OTHER PUBLICATIONS

Office action dated Jun. 25, 2013 in corresponding Japanese Application No. 2011-193162.

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

An air conditioner for a vehicle includes a cycle switching device. The cycle switching device switches a refrigerant cycle between a heating circuit, in which refrigerant flows through a heating heat exchanger, and a cooling circuit, in which refrigerant flows through a cooling heat exchanger. The air conditioner further includes an air conditioning controller, which controls the cycle switching device and includes a defroster control portion. The defroster control portion increases a temperature of air blown into the vehicle compartment through a defroster air outlet by a predetermined degree while keeping the refrigerant cycle at a state of the heating circuit for a predetermined time, when a defrosting operation is commanded to be performed during the heating circuit.

7 Claims, 6 Drawing Sheets

(51) Int. Cl.
*F25B 41/04* (2006.01)
*B60H 1/00* (2006.01)

(56) References Cited

U.S. PATENT DOCUMENTS

| | | | | |
|---|---|---|---|---|
| 5,669,231 | A | * 9/1997 | Itoh | B60H 1/00907 62/210 |
| 5,971,845 | A | 10/1999 | Echigoya et al. | |
| 7,793,711 | B2 | * 9/2010 | Ichikawa | B60H 1/00785 165/202 |
| 2003/0056531 | A1 | * 3/2003 | Nishida | B60H 1/00064 62/244 |
| 2011/0005255 | A1 | * 1/2011 | Tanihata | B60H 1/00785 62/238.7 |
| 2013/0052929 | A1 | * 2/2013 | Eisenhour | B60H 1/00742 454/75 |

FOREIGN PATENT DOCUMENTS

| | | |
|---|---|---|
| JP | 2004-268790 | 9/2004 |
| JP | 2011-016446 | 1/2011 |

* cited by examiner

AIR CONDITIONER FOR VEHICLE WITH DEFROSTER CONTROL

CROSS REFERENCE TO RELATED APPLICATION

This application is based on and incorporates herein by reference Japanese Patent Application No. 2011-193162 filed on Sep. 5, 2011.

TECHNICAL FIELD

The present disclosure relates to an air conditioner for a vehicle, which is capable of performing cooling and heating operations and limiting generation of bad odor in air blown into a vehicle compartment.

BACKGROUND

Conventionally, an air conditioner for a vehicle is described in Patent Document 1 (JP 3538845 B2 corresponding to U.S. Pat. No. 5,299,431). The air conditioner includes a heating heat exchanger and a cooling heat exchanger to heat or cool air blown into a vehicle compartment. A refrigerant cycle of the air conditioner can be switched between a heating circuit, in which the heating heat exchanger is arranged, and a cooling circuit, in which the cooling heat exchanger is arranged. The air conditioner further includes an electromagnetic valve to switch the refrigerant cycle between the heating circuit and the cooling circuit.

In the air conditioner of Patent Document 1, the refrigerant cycle may be different between before and after a defrosting operation, in which air is blown to a windshield of the vehicle, is performed. When the cooling circuit is changed to the heating circuit, water adhering to a surface of the cooling heat exchanger may evaporate. Therefore, fogging of the windshield and bad odor generation may occur.

SUMMARY

According to an aspect of the present disclosure, an air conditioner for a vehicle includes a heating heat exchanger, a cooling heat exchanger, a cycle switching device, a plurality of air outlets, an air conditioning controller and a defroster switch. The heating heat exchanger and the cooling heat exchanger are accommodated in a duct. The cycle switching device switches a refrigerant cycle, through which refrigerant circulates, between a heating circuit, in which refrigerant flows through the heating heat exchanger to heat air blown into a vehicle compartment, and a cooling circuit, in which refrigerant flows through the cooling heat exchanger to cool air blown into the vehicle compartment. Air in the duct is blown into the vehicle compartment through the air outlets. The air conditioning controller controls the cycle switching device. The defroster switch is operative to command the air conditioning controller to perform a defrosting operation in which air is blown out of the duct toward a windshield of the vehicle through a defroster air outlet of the air outlets. The air conditioning controller includes a defroster control portion. The defroster control portion is configured to increase a temperature of air blown into the vehicle compartment through the defroster air outlet by a predetermined degree while keeping the refrigerant cycle at a state of the heating circuit for a predetermined time, when the defrosting operation is commanded to be performed in the heating circuit.

According to an another aspect of the present disclosure, an air conditioner for a vehicle includes a duct, a heating heat exchanger, a cooling heat exchanger, a cycle switching device, a defroster air outlet and a defroster switch. Air is blown into a vehicle compartment by a blower through the duct. The heating heat exchanger is accommodated in the duct and is arranged in a heating circuit of a refrigerant cycle, through which refrigerant circulates, to heat air by heat exchange with refrigerant flowing through the heating heat exchanger. The cooling heat exchanger is accommodated in the duct and is arranged in a cooling circuit of the refrigerant cycle to cool air by heat exchange with refrigerant flowing through the cooling heat exchanger. The cycle switching device switches the refrigerant cycle between the heating circuit and the cooling circuit to heat or cool air. The defroster air outlet is arranged at a downstream side of the duct in the air flow direction, and the defroster air outlet is a port through which air is blown out of the duct into the vehicle compartment toward an inner surface of a windshield of the vehicle. The defroster switch is operative to command to perform a defrosting operation in which air is blown out of the duct through the defroster air outlet. The air conditioning controller includes a circuit keeping portion and a ventilation-mode performing portion. The circuit keeping portion is configured to keep the refrigerant cycle during the defrosting operation. The ventilation-mode performing portion is configured to limit a flow amount of refrigerant flowing through the cooling heat exchanger and to blow outside air into the vehicle compartment for a predetermined time period after the defrosting operation is stopped.

Because the above-described air conditioner includes the defroster control portion or the circuit keeping portion, the refrigerant cycle is not switched from the heating circuit to the cooling circuit even when a temperature of conditioned air blown into the vehicle compartment is increased. Accordingly, a surface of the cooling heat exchanger can be prevented from wetting with water contained in air, and bad odor can be thereby prevented from being generated from the surface of the cooling heat exchanger. Additionally, fogging of the windshield can be prevented.

The air conditioner may further include a ventilation-mode performing portion configured to limit a flow amount of refrigerant flowing through the cooling heat exchanger and to blow outside air, which is air outside the vehicle, into the vehicle compartment through the defroster air outlet for a predetermined time period after the defrosting operation is stopped.

In this case, when the defrosting operation is stopped, the ventilation-mode performing portion may stop, for example, operation of a compressor which discharges refrigerant, in order to limit the flow amount of refrigerant flowing through the cooling heat exchanger. Accordingly, the wetting of the surface of the cooling heat exchanger can be limited. Moreover, because outside air is blown through the defroster air outlet, a state of the vehicle compartment, in which a temperature of the vehicle compartment has been increased during the defrosting operation, can be made to approach a state before the defrosting operation, while the generation of bad odor and the fogging of the windshield can be prevented.

The air conditioner may further include a heating circuit change portion configured to stop the keeping of the refrigerant cycle at the state of the heating circuit when a temperature in the vehicle compartment is reduced by a user during the defrosting operation.

In this case, the heating circuit change portion may stop the keeping of the heating circuit when the temperature in the vehicle compartment is reduced in a state where the heating circuit is kept by the defroster control portion. Therefore, an air conditioning operation based on the cooling circuit can be performed to meet a requirement of the user, and comfort in the vehicle compartment can be thereby improved.

The air conditioner may further include a circuit determination portion configured to determine the refrigerant cycle between the heating circuit and the cooling circuit. Additionally, the air conditioner may include a circuit restart portion configured to stop the limitation of the flow amount of refrigerant flowing through the cooling heat exchanger, and to perform an air conditioning operation based on the refrigerant cycle determined by the circuit determination portion, when the predetermined time period has passed after the stop of the defrosting operation.

In this case, the circuit restart portion is capable of stopping the limitation of the flow amount of refrigerant flowing through the cooling heat exchanger when the predetermined time period has passed after the stop of the defrosting operation. Therefore, the limitation of the flow amount of refrigerant flowing through the cooling heat exchanger can be prevented from lasting indefinitely, and an air conditioning operation based on the refrigerant cycle determined by the circuit determination portion can be performed.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

An exemplar embodiment of the present disclosure will be described below referring to FIGS. 1 to 4C.

Figure 1:
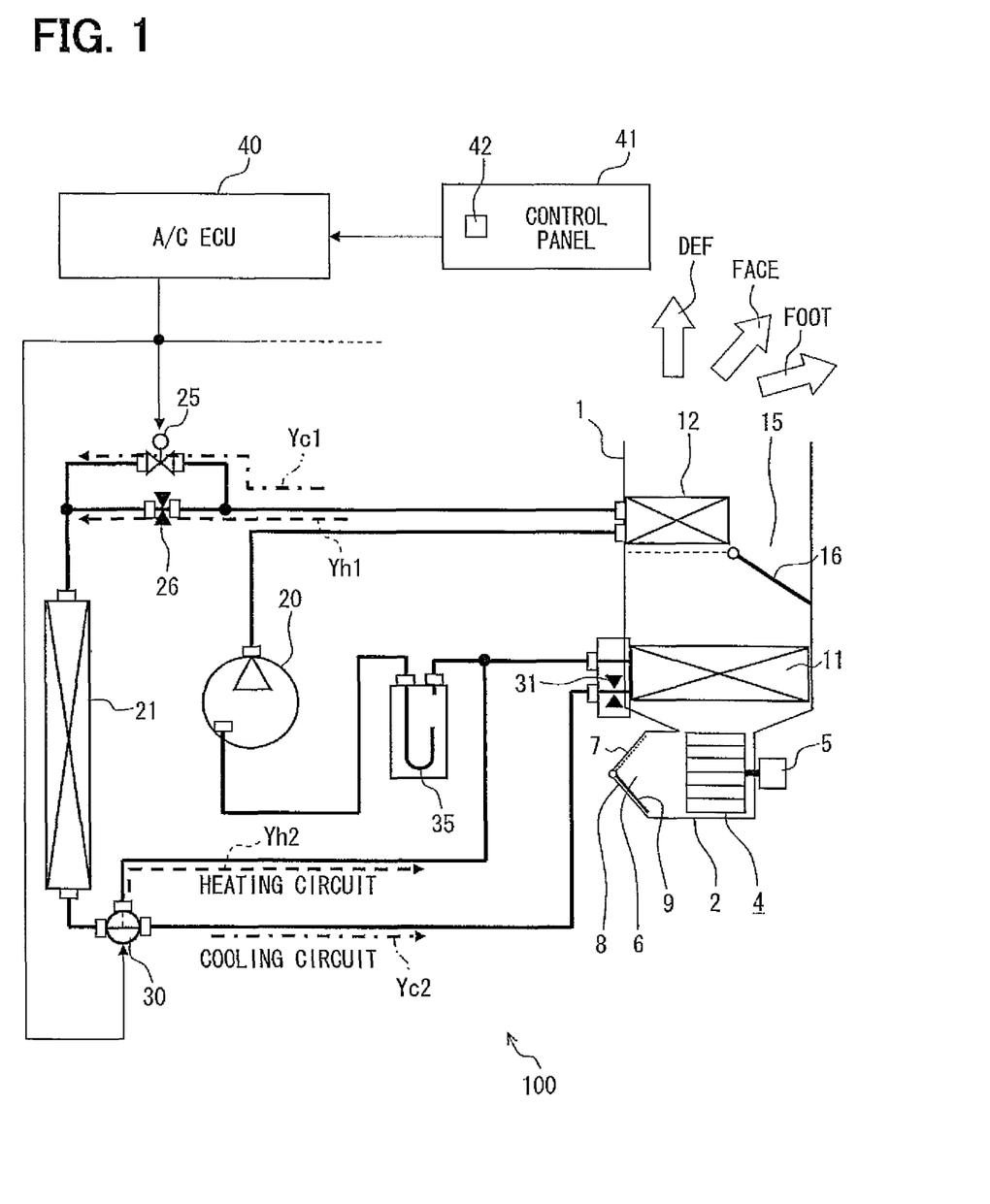
FIG. 1 is a schematic diagram showing an air conditioner for a vehicle, according to an exemplar embodiment of the present disclosure.

As shown in FIG. 1, an air conditioner 100 for a vehicle includes a duct 1 which defines an air passage and is arranged in a vehicle compartment, a fan casing 2 connected to an upstream side of the duct 1 in a flow direction of air flowing in the air passage, and a blower 4 such as a sirocco fan accommodated in the fan casing 2.

The blower 4 is rotary-driven by a blower motor 5 connected to a center of the blower 4. The fan casing 2 has an inside-outside air switching space 6 therein. The inside-outside air switching space 6 communicates with an inside air inlet 7, through which inside air (i.e., air inside the vehicle compartment) is introduced into the duct 1, and an outside air inlet 8, through which outside air (i.e., air outside the vehicle compartment) is introduced into the duct 1.

In the inside-outside air switching space 6, an inside-outside air switching damper 9 is provided, and the inside-outside air switching damper 9 is capable of selectively adjusting open areas of the inside air inlet 7 and the outside air inlet 8 to adjust a ratio of flow amounts introduced into the duct 1 between the inside air and the outside air. A most downstream part (upper part in FIG. 1) of the duct 1 in the air flow direction has air outlets through which conditioned air blown into the vehicle compartment.

The air outlets include a face air outlet (FACE) through which conditioned air is blown toward head and chest areas of a passenger, a foot air outlet (FOOT) through which conditioned air is blown toward a foot area of the passenger, and a defroster air outlet (DEF) through which conditioned air is blown toward an inner surface of a windshield of the vehicle. A face door, a foot door and a defroster door (not shown) are provided respectively in the face air outlet, foot air outlet and the defroster air outlet to control a flow amount of air flowing out of the duct 1.

The air conditioner 100 further includes a cooling heat exchanger 11 (interior evaporator) and a heating heat exchanger 12 (interior condenser), which are arranged inside the duct 1 and are components of a refrigerant cycle of the air conditioner 100. The heating heat exchanger 12 is arranged downstream of the cooling heat exchanger 11 in the air flow direction.

The cooling heat exchanger 11 is used as an air cooler, which cools air by absorbing heat of the air as heat of evaporation of refrigerant flowing in the cooling heat exchanger 11 at a time of heat exchange. The heating heat exchanger 12 is used as an air heater, which heats air by radiating heat of condensation of refrigerant flowing in the heating heat exchanger 12 at a time of heat exchange. The cooling heat exchanger 11 and the heating heat exchanger 12 constitute an interior heat exchanger 11, 12.

A bypass passage 15 is provided at one side of the heating heat exchanger 12 in a direction perpendicular to the air flow direction in the duct 1 as shown in FIG. 1. An air mix damper 16 is arranged upstream of the heating heat exchanger 12 and the bypass passage 15 in the air flow direction in the duct 1, and continuously changes a flow amount ratio between air flowing through the heating heat exchanger 12 and air flowing through the bypass passage 15 by rotating around an end of the air mix damper 16.

The refrigerant cycle of the air conditioner 100 includes a compressor 20 which compresses and discharges refrigerant by being driven by an electric motor. An installation location of the compressor 20 is not limited specifically because the compressor 20 is arranged inside a hermetic casing integrally with the electric motor which drives the compressor 20.

For example, the compressor 20 may be arranged in a portion of the vehicle other than the vehicle compartment in order to satisfy a condition for maintenance and inspection. An exterior heat exchanger 21 is arranged on a front side of the vehicle in a traveling direction of the vehicle to exchange heat with outside air properly.

Thus, when the vehicle is running, the exterior heat exchanger 21 is capable of performing heat exchange between refrigerant and air successfully by receiving air. The heating heat exchanger 12 located in the duct 1 is connected to the exterior heat exchanger 21 via a refrigerant pipe. A valve portion 25 (electromagnetic valve), which is a pilot electromagnetic valve, and a heating throttle 26 are provided in the refrigerant pipe from the heating heat exchanger 12 to the exterior heat exchanger 21.

The air conditioner 100 further includes an air conditioning controller 40 (A/C ECU) which supplies control signals to an electromagnetic valve or the like and receives information from various sensors, and a control panel 41 which outputs a control signal to the air conditioning controller 40 and displays a state of air conditioning performed by the air conditioner 100.

The control panel 41 is arranged at a position easily viewable by a user such as a passenger and a driver in the vehicle compartment. The control panel 41 includes a fan switch which sets a rotation rate of the blower motor 5, a temperature adjusting switch which controls an open degree of the air mix damper 16, a mode switch which controls each air outlet door to switch an air outlet mode, a control switch which switches and controls the inside-outside air switching damper 9, an air conditioning switch which activates the air conditioner 100, an economy switch which performs an energy-saving operation of the air conditioner 100, and an OFF switch which stops an operation of the air conditioner 100. The mode switch includes a defroster switch 42 described later.

A rotation rate of the compressor 20 is controlled based on a signal from a temperature sensor, which detects a temperature of air flowing at an air outlet of the cooling heat exchanger 11, so that the air temperature at the air outlet of the cooling heat exchanger 11 becomes approximately in a range from 3° C. to 4° C.

When the economy switch of the control panel 41 is turned ON, the rotation rate of the compressor 20 is variably controlled based on a signal from a temperature sensor provided in the vehicle compartment so that the air temperature at the air outlet of the cooling heat exchanger 11 becomes approximately in a range from 10° C. to 11° C.

When the air conditioning switch of the control panel 41 is turned ON, the compressor 20 is rotary-activated. When the rotation rate of the blower motor 5 is set at a low rate, a middle rate or a high rate by using the fan switch, the blower motor 5 is rotated in a selected rotation rate.

In a cooling operation, high-pressure and high-temperature refrigerant discharged from the compressor 20 flows through the heating heat exchanger 12 and the valve portion 25, and then flows into the exterior heat exchanger 21 to be condensed. The air conditioner 100 further includes a three-way valve 30 as an example of a cycle switching device which switches a refrigerant cycle of the air conditioner 100 between a heating circuit and a cooling circuit shown in FIG. 1. The exterior heat exchanger 21 is connected to a cooling throttle 31 via the three-way valve 30 in the cooling circuit, and the exterior heat exchanger 21 is connected to an accumulator 35 via the three-way valve 30 in the heating circuit.

In the cooling circuit, the refrigerant cooled and condensed in the exterior heat exchanger 21 flows into the cooling heat exchanger 11 inside the duct 1 through the cooling throttle 31 (e.g., fixed throttle). Subsequently, the refrigerant flowing out of the cooling heat exchanger 11 is separated in the accumulator 35 into gas refrigerant and liquid refrigerant, and the gas refrigerant is supplied to the compressor 20.

The cooling throttle 31 adiabatically-expands refrigerant flowing therethrough so that the refrigerant becomes low-temperature and low-pressure misty refrigerant. The misty refrigerant is supplied to the cooling heat exchanger 11 to exchange heat with air supplied by the blower 4. Hence, the refrigerant absorbs heat from the supplied air as heat of evaporation of the refrigerant, and evaporates at a low pressure. Then, the evaporated refrigerant is drawn into the compressor 20. A capillary tube may be used as the cooling throttle 31 that is an example of a decompression portion.

The air mix damper 16 fully closes the air passage of the heating heat exchanger 12, when the air mix damper 16 is positioned as shown by a dash line in FIG. 1. In a fully closed state of the air mix damper 16, air blown by the blower 4 is not introduced into the heating heat exchanger 12. Therefore, refrigerant is condensed in the exterior heat exchanger 21.

When the air mix damper 16 fully closes the air passage of the heating heat exchanger 12 as shown by the dash line in FIG. 1, enthalpy loss of refrigerant in the heating heat exchanger 12 can be ignored, and air cooled by the cooling heat exchanger 11 can be thereby used for cooling the vehicle compartment.

Next, a flow state of air in the exemplar embodiment will be described. Air selectively introduced into the duct 1 by the inside-outside air switching damper 9 is supplied to the cooling heat exchanger 11, and the supplied air is cooled by gasification of refrigerant at a time of passing through the cooling heat exchanger 11 to have a temperature approximately from 3° C. to 4° C. at the air outlet of the cooling heat exchanger 11. Subsequently, the cooled air flows toward the heating heat exchanger 12 or/and the bypass passage 15.

The flow amount ratio between air flowing through the heating heat exchanger 12 and air flowing through the bypass passage 15 is adjusted by the air mix damper 16 arbitrarily. When a maximum cooling operation is required, the air mix damper 16 closes the heating heat exchanger 12 to guide all air to the bypass passage 15. Accordingly, the air cooled in the cooling heat exchanger 11 flows toward the air outlets through the bypass passage 15 without change in temperature.

When a temperature in the vehicle compartment is too low during the cooling operation, a temperature of air (outlet air) blown out of the duct 1 through the air outlets is increased by reducing the rotation rate of the compressor 20. When the temperature of the outlet air cannot be reduced even by the reduction of the rotation rate of the compressor 20, the air mix damper 16 is controlled to open the air passage of the heating heat exchanger 12 slightly so that a part of air flowing from the cooling heat exchanger 11 is introduced into the heating heat exchanger 12. The air passed through the heating heat exchanger 12 is mixed with air, which has passed through the bypass passage 15, in an air mix chamber, provided downstream of the heating heat exchanger 12 and the bypass passage 15 in the air flow direction in the duct 1.

The mixed air (conditioned air) having a desired temperature is blown into the vehicle compartment through the air outlets, and a flow amount of the mixed air blown into the vehicle compartment is adjusted by the face door, the foot door and the defroster door. When the mode switch of the control panel is set in a face mode, the face door is open, and the foot and defroster doors are closed. Thus, in the face mode, the mixed air (e.g., cool air in the cooling operation) is blown mainly toward head and chest areas of a passenger.

When the mode switch is set in a bi-level mode, the defroster door is closed, and the face and foot doors are open. When the mode switch is set in a foot mode, the foot door is open, and the face and defroster doors are closed. In the foot mode, air passed through the heating heat exchanger 12 is blown toward a foot area of the passenger through the foot air outlet.

When the mode switch is set in a defroster mode, in other words, when the defroster switch 42 is turned ON, the defroster door is open, and the face and foot doors are closed. Thus, conditioned air is blown toward the inner surface of the windshield through the defroster air outlet DEF.

In the exemplar embodiment, the open degree of the air mix damper 16, the rotation rate of the blower motor 5, and the rotation rate of the compressor 20 are controlled automatically, but may be controlled manually in priority to the automatic control.

When an actual temperature in the vehicle compartment is lower than a target outlet temperature TAO that is a target temperature of the outlet air, in other words, when a cooling capacity of the air conditioner 100 is excess in the cooling operation, a discharge capacity of the compressor 20 is reduced. In this case, a frequency of a signal outputted from an inverter to the electric motor which drives the compressor 20 is reduced. Accordingly, the rotation rate of the electric motor is reduced, and the rotation rate of the compressor 20 is thereby reduced. As a result, the discharge capacity of the compressor 20 is reduced.

As shown in FIG. 1, in the exemplar embodiment, the refrigerant cycle of the air conditioner 100 includes the accumulator 35. Specifically, the accumulator 35 is arranged between a refrigerant outlet of the cooling heat exchanger 11 and a suction side of the compressor 20.

(Cooling Operation)

As shown by alternate long and short dash arrows Yc1, Yc2 in FIG. 1, refrigerant circulates through the cooling circuit in the cooling operation. High-temperature and high-pressure refrigerant discharged from the compressor 20 flows into the heating heat exchanger 12. In the cooling operation, the air mix damper 16 is positioned at the dash line (MAX COOL position) shown in FIG. 1. Thus, air blown by the blower 4 bypasses the heating heat exchanger 12, and does not exchange heat with refrigerant in the heating heat exchanger 12.

The valve portion 25, which is an electromagnetic valve, is controlled to be open by a control signal outputted from the air conditioning controller 40 in the cooling operation. Hence, refrigerant flowing out of the heating heat exchanger 12 flows into the exterior heat exchanger 21 with keeping its high-temperature and high-pressure state.

The high-pressure and high-temperature refrigerant is condensed in the exterior heat exchanger 21, and the condensed high-pressure refrigerant flows into the three-way valve 30. The three-way valve 30 is controlled by the air conditioning controller 40 to let the high-pressure refrigerant flow toward the cooling throttle 31.

Low-pressure two-phase refrigerant decompressed by the cooling throttle 31, which is a fixed throttle, is evaporated in the cooling heat exchanger 11. Refrigerant passed through the cooing heat exchanger 11 is drawn into the compressor 20 through the accumulator 35.

(Heating Operation)

As shown by dash arrows Yh1, Yh2 in FIG. 1, refrigerant circulates through the heating circuit in the heating operation. High-temperature and high-pressure refrigerant discharged from the compressor 20 flows into the heating heat exchanger 12 to exchange heat with air blown by the blower 4. The air mix damper 16 fully opens the air passage of the heating heat exchanger 12 and fully closes the bypass passage 15.

The valve portion 25 is controlled to be closed by a control signal outputted from the air conditioning controller 40 in the heating operation. Hence, the refrigerant flowing out of the heating heat exchanger 12 is decompressed in the heating throttle 26 to be low-pressure two-phase refrigerant and to flow into the exterior heat exchanger 21. Low-pressure gas refrigerant evaporated in the exterior heat exchanger 21 flows into the three-way valve 30, and the three-way valve 30 is controlled by the air conditioning controller 40 to let refrigerant flow to the compressor 20 through the accumulator 35 without passing through the cooling heat exchanger 11.

Figure 2:
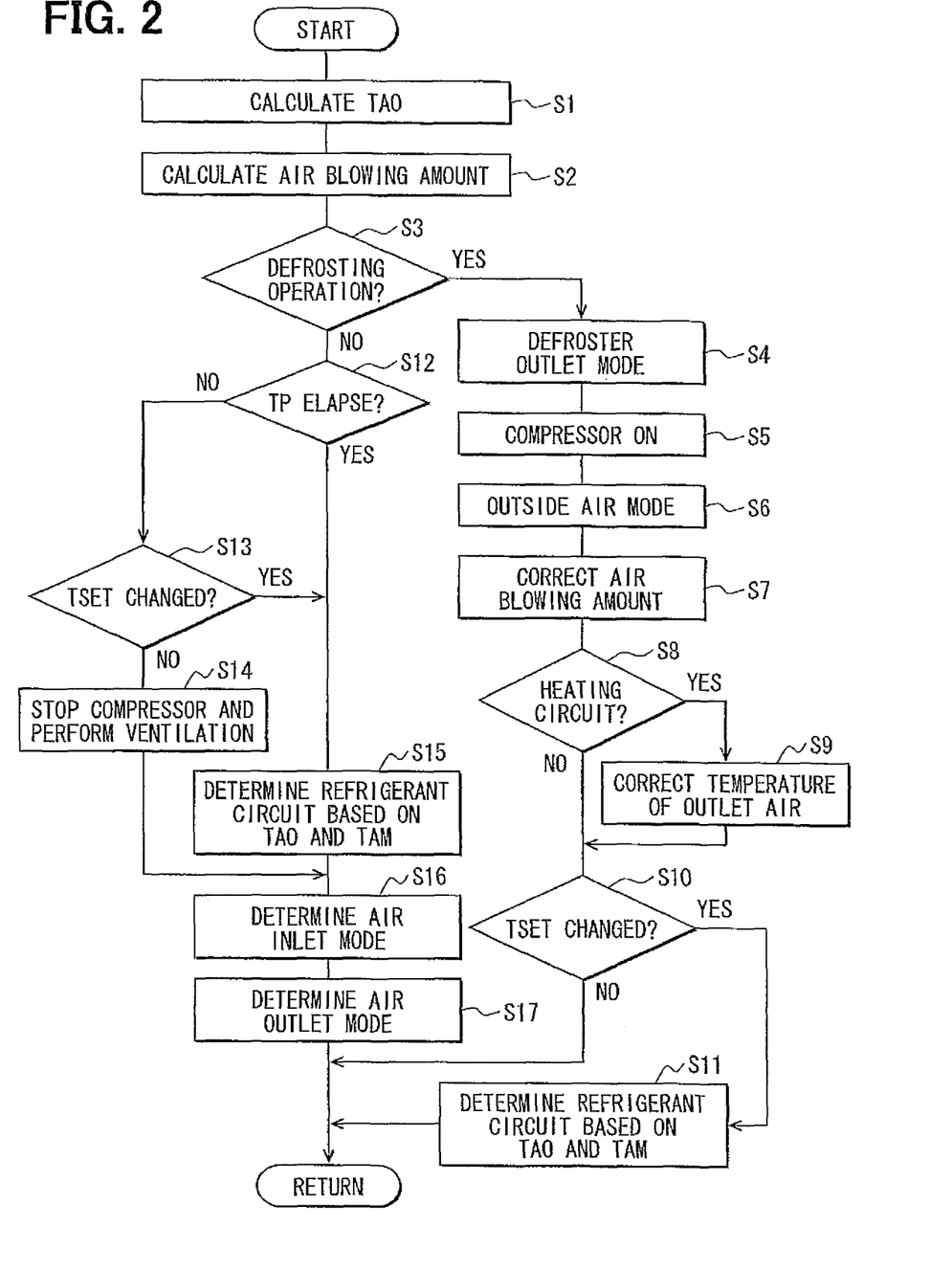
FIG. 2 is a flowchart showing a part of a control process of an air conditioning controller for the air conditioner according to the exemplar embodiment.

A control process from the start to the return shown in FIG. 2 is repeatedly performed at predetermined intervals. When the control process is started, the target outlet temperature TAO is calculated based on an inside temperature Tr that is a temperature in the vehicle compartment, an outside temperature TAM, a radiation amount Ts, a preset temperature TSET and the like at step S1.

Next, at step S2, a standard air blowing amount is calculated based on the outlet air temperature TAO. At step S3, the air conditioning controller 40 determines whether a defrosting operation is performed. Specifically, at step S3, the air conditioning controller 40 determines whether the defroster switch 42 of the control panel 41 is turned ON, or whether an alternative automatic defroster switch becomes ON automatically. A portion of the air conditioning controller 40, which performs the control operation of step S3, may be used as an example of a circuit keeping portion, which keeps the refrigerant cycle during the defrosting operation.

When the air conditioning controller 40 determines that the defroster switch 42 is turned ON by a user such as a passenger, in other words, when the air conditioning controller 40 determines that the defrosting operation is performed, a control operation of step S4 is performed. At step S4, the air outlet mode of the air outlets is set in the defroster mode, in other words, the defroster air outlet DEF is opened. At step S5, the compressor 20 is turned ON if the compressor 20 is not in operation.

At step S6, the air conditioning controller 40 controls the inside-outside air switching damper 9 in the inside-outside air switching space 6 shown in FIG. 1 so that outside air is introduced into the duct 1. In other words, the air conditioning controller 40 sets an outside air mode as an inlet air mode at step S6. At step S7, the air blowing amount calculated at step S2 is corrected to be increased somewhat for the defroster mode.

At step S8, the air conditioning controller 40 determines whether a present refrigerant cycle is the heating circuit.

When the present refrigerant cycle is the heating circuit at step S8, the target outlet temperature TAO is increased by a predetermined degree at step S9 in order to correct a temperature of the outlet air.

A portion of the air conditioning controller 40 which performs the control operation of step S9 is used as an example of a defroster control portion together with a portion of the air conditioning controller 40 which performs a control operation of step S12 described later. The defroster control portion increases a temperature of air flowing out through the defroster air outlet DEF into the vehicle compartment when the defroster mode is selected in the heating operation. Additionally, the defroster control portion keeps the heating circuit for a predetermined period unless a passenger changes the preset temperature TSET. The portion of the air conditioning controller 40 which performs the control operation of step S9 may be used as an example of temperature increase portion which increases the temperature of air flowing out through the defroster air outlet DEF into the vehicle compartment when the refrigerant cycle is the heating circuit at the start time of the defrosting operation.

When the present refrigerant cycle is not the heating circuit at step S8, or after the control process of step S9 is performed, a control operation of step S10 is performed. At step S10, the air conditioning controller 40 determines whether a user such as a driver has operated a temperature setting switch of the control panel 41 to change the preset temperature TSET.

When the preset temperature TSET has been changed, the air conditioning controller 40 determines the refrigerant cycle between the heating circuit and the cooling circuit at step S11 based on, for example, the target outlet temperature TAO and the outside temperature TAM in order to meet the requirement of the user. When the preset temperature TSET has not been changed at step S10, the control process returns to the control operation of step S1.

Because the refrigerant cycle may be changed from the heating circuit to the cooling circuit through the control operations of steps S10, S11, portions of the air conditioning controller 40, which performs the control operations of steps S10, S11, are examples of a heating circuit change portion, which changes the refrigerant cycle from the heating circuit when the user operates the control panel 41 to decrease a temperature Tr in the vehicle compartment during the heating operation.

As described above, because air is blown through the defroster air outlet DEF, fogging of the windshield can be removed. In the heating operation where refrigerant flows in the heating circuit, warm air, which is further elevated in temperature by the control operation of step S9, is blown through the defroster air outlet DEF, so that the windshield is prevented from fogging. On the other hand, in the cooling operation where refrigerant flows in the cooling circuit, cool air having a low humidity is blown through the defroster air outlet DEF, so that the fogging of the windshield is prevented.

Next, when the user turns OFF the defroster switch 42, or when the alternative automatic defroster switch becomes OFF, in other words, when the defrosting operation is stopped, a control operation of step S12 is performed after the control operation of step S3. At step S12, the air conditioning controller 40 determines whether an elapsed time after the stop of the defrosting operation is equal to or shorter than a predetermined time period TP (e.g., 300 seconds), in other words, whether the predetermined time period TP elapses after the stop of the defrosting operation.

When the elapsed time is equal to or shorter than the predetermined time period TP, in other words, when the time period TP does not elapse after the stop of the defrosting operation, the air conditioning controller 40 determines at step S13 whether the user has operated the control panel 41 to change the preset temperature TSET. When the preset temperature TSET is determined not to be changed at step S13, the compressor 20 is stopped, and a ventilation operation is performed so that outside air is introduced into the vehicle compartment at step S14. In other words, at step S14, the ventilation operation is performed, so that outside air is introduced immediately after the turning OFF of the defroster switch 42. Hence, portions of the air conditioning controller 40, which performs the control operations of steps S12 and S14, are used as examples of a ventilation-mode performing portion which limits a flow amount of refrigerant flowing through the cooling heat exchanger 11 and blows outside air into the vehicle compartment through the defroster air outlet DEF for the predetermined time period TP after the defrosting operation is stopped.

When the elapsed time after the stop of the defrosting operation is determined longer than the time period TP at step S12, in other words, when the predetermined time period TP elapses after the stop of the defrosting operation, or when the preset temperature TSET has been changed at step S13, a control operation of step S15 is performed. At step S15, the air conditioning controller 40 determines the refrigerant cycle between the heating circuit and the cooling circuit based on the target outlet temperature TAO and the outside temperature TAM by using a map shown in FIG. 3. Therefore, a portion of the air conditioning controller 40, which performs the control operation of step S15, is used an example of a circuit determination portion which determines the refrigerant cycle between the cooling circuit and the heating circuit.

When the time period TP has passed in a state where outside air is blown by the ventilation-mode performing portion (step S14), in other words, when the time period TP is determined to elapse after the stop of the defrosting operation at step S12, the air conditioning controller 40 is capable of stopping the limitation of the flow amount of refrigerant flowing through the cooling heat exchanger 11, i.e., activating the compressor 20. Subsequently, at step S15, the refrigerant cycle is selected between the cooling circuit and the heating circuit by using the map shown in FIG. 3, and then an air conditioning operation is performed based on the refrigerant cycle selected at step S15.

Therefore, the portion of the air conditioning controller 40, which performs the control operation of step S12, is used also as an example of a circuit restart portion. The circuit restart portion is capable of stopping the limitation of the flow amount of refrigerant flowing through the cooling heat exchanger 11, and performing an air conditioning operation based on a refrigerant cycle selected between the heating circuit and the cooling circuit by the circuit determination portion, when the predetermined time period TP elapses after the stop of the defrosting operation.

At step S16, the air conditioning controller 40 determines an air inlet mode based on the target outlet temperature TAO to adjust a position of the inside-outside air switching damper 9. At step S17, the air conditioning controller 40 determines the air outlet mode such as the face mode, the foot mode, and the bi-level mode based on the target outlet temperature TAO.

As described above, when the predetermined time period TP elapses after the stop of the defrosting operation, the air conditioning controller 40 stops performing the ventilation operation not to introduce outside air, and determines the refrigerant cycle between the heating circuit and the cooling circuit based on the target outlet temperature TAO and the outside temperature TAM at step S15. Based on the determined refrigerant cycle, the air conditioning controller 40 controls the switching of the three-way valve 30 shown in FIG. 1 to perform the heating operation, in which refrigerant circulates in the heating circuit, or the cooling operation, in which refrigerant circulates in the cooling circuit.

Figure 3:
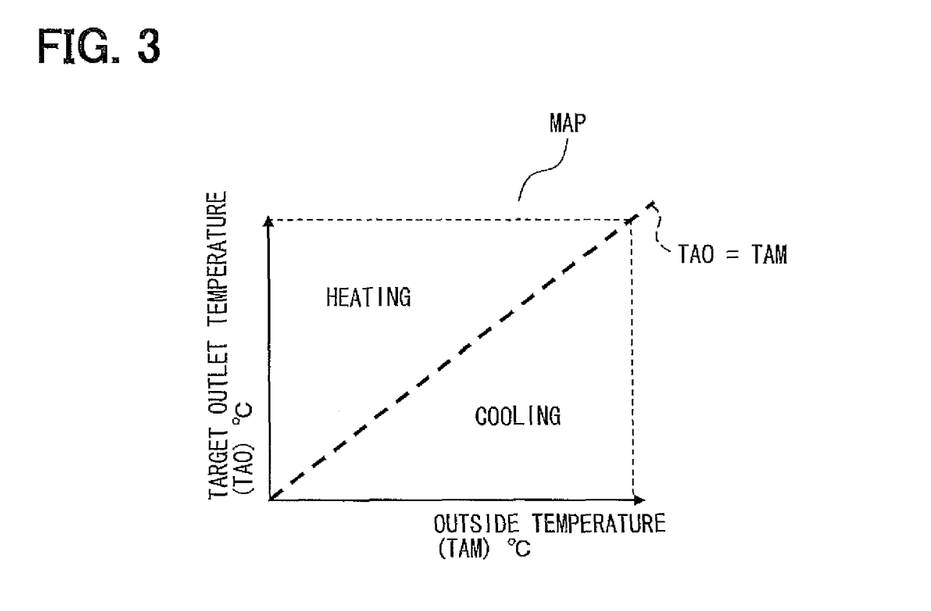
FIG. 3 is a diagram showing a map used when a refrigerant cycle for the air conditioner is determined between a cooling circuit and a heating circuit based on a target outlet temperature TAO and an outside temperature TAM, according to the exemplar embodiment.

The map shown in FIG. 3 is stored in a memory inside the air conditioning controller 40, and the air conditioning controller 40 generally determines the refrigerant cycle by using the map shown in FIG. 3 based on an inputted present outside temperature TAM and an inputted present target outlet temperature TAO.

In FIG. 3, the ordinate axis indicates the outside temperature TAM, and the abscissa axis indicates the target outlet temperature TAO. The outside temperature TAM is equal to the target outlet temperature TAO on a diagonal dash line shown in FIG. 3. When a present state obtained from a present outside temperature TAM and a present target outlet temperature TAO is located upper than the diagonal dash line in FIG. 3, the heating circuit is selected as the refrigerant cycle, in other words, the heating operation is performed. When the present state is located lower than the diagonal dash line, the cooling circuit is selected as the refrigerant cycle, in other words, the cooling operation is performed.

Figure 4A:
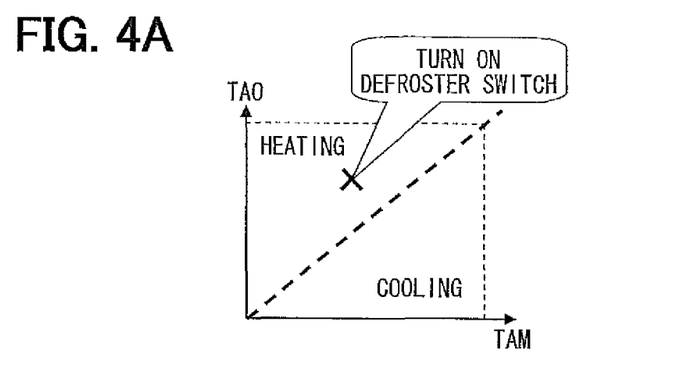
FIG. 4A is a diagram showing a state in which a defroster switch is turned ON during a heating operation of the air conditioner according to the exemplar embodiment.

It will be described how the refrigerant cycle is switched in a case where the defrosting operation is performed in the heating operation, with reference to FIGS. 4A to 4C. When the determination is YES at step S3, in other words, when the defroster switch 42 is turned ON during the heating operation as indicated by a cross mark in FIG. 4A, warm air is blown through the defroster air outlet DEF. The warm air has been further increased in temperature by the control operation of step S9.

Because the warm air having the further increased temperature is blown through the defroster air outlet DEF into the vehicle compartment, the inside temperature Tr that is the temperature in the vehicle compartment increases. Hence, the target outlet temperature TAO calculated based on the inside temperature Tr is decreased as shown in FIG. 4B.

As in the above description of the control process of step S10 shown in FIG. 2, the refrigerant cycle is not switched and is kept at a state of the heating circuit during the defrosting operation unless the user such as a driver changes the preset temperature TSET. That is, even when the present target outlet air temperature TAO becomes lower than the outside temperature TAM as shown by a solid arrow in FIG. 4B, the refrigerant cycle is kept at the state of the heating circuit unless the user changes the preset temperature TSET. Because refrigerant does not flow through the cooling heat exchanger 11 in the state of the heating circuit, a surface of the cooling heat exchanger (evaporator) 11 can be prevented from wetting with water contained in air, and be kept at a dry state.

When the user turns OFF the defroster switch 42 subsequently as indicated by a solid cross mark in FIG. 4B, the compressor 20 is stopped, and the ventilation operation is performed at step S14 as indicated by a dash cross mark in FIG. 4C so that outside air is introduced into the vehicle compartment. Also in the ventilation operation after the stop of the defrosting operation, refrigerant does not flow through the cooling heat exchanger 11 because the compressor 20 is stopped. Thus, the surface of the cooling heat exchanger 11 can be prevented from wetting. Therefore, bad odor generation and fogging of the windshield, which are caused by evaporation of water attached to the surface of the cooling heat exchanger 11, can be prevented.

As described above, when the defrosting operation is performed during the heating operation, the refrigerant cycle can be kept at the state of the heating circuit during the defrosting operation. Additionally, the ventilation operation can be performed for the predetermined time period TP after the defrosting operation is stopped. Therefore, even when the present state in the map moves across the diagonal dash line, on which the outside temperature TAM is equal to the target outlet temperature TAO, as shown by solid arrows in FIGS. 4B and 4C, it can be prevented the bad odor generation and the fogging of the windshield from being caused by evaporation of water attached to the surface of the cooling heat exchanger 11.

Figure 5A:
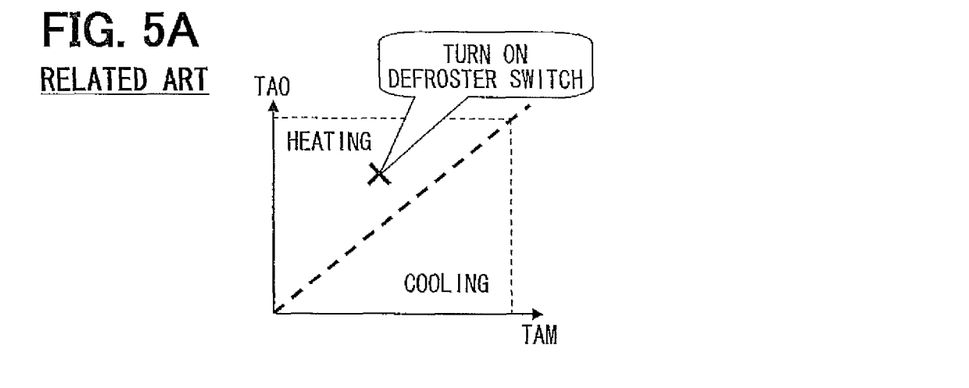
FIG. 5A is a diagram showing a state in which a defroster switch is turned ON during a heating operation of an air conditioner according to a comparative example.
Figure 5B:
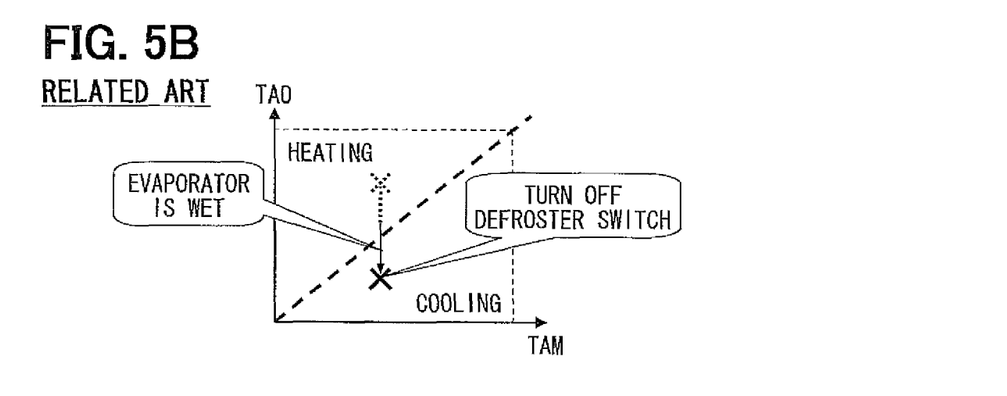
FIG. 5B is a diagram showing a state in which a target outlet temperature TAO decreases, and the defroster switch is turned OFF during a cooling operation of the air conditioner, after the turning ON of the defroster switch shown in FIG. 5A.

Here, a comparative example will be described referring to FIGS. 5A to 5C. In the comparative example, an air conditioning controller does not perform the control process shown in FIG. 2. Hence, the bad odor generation and the fogging of the windshield may be occurred in the comparative example. When a user turns ON a defroster switch as indicated by a solid cross mark in FIG. 5A, warm air is blown through a defroster air outlet to increase a temperature in a vehicle compartment. Subsequently, a target outlet temperature TAO decreases in accordance with increase of the temperature in the vehicle compartment, and a refrigerant cycle is switched from a heating circuit to a cooling circuit when the target outlet temperature TAO becomes lower than an outside temperature TAM as shown in FIG. 5B.

When the refrigerant cycle is the cooling circuit, water contained in air generally adheres to a surface of a cooling heat exchanger (evaporator), and the cooling heat exchanger becomes wet. When the user turns OFF the defroster switch as indicated by a solid cross mark in FIG. 5B, warm air is stopped being blown through the defroster air outlet, and the temperature in the vehicle compartment thereby decreases.

Figure 5C:
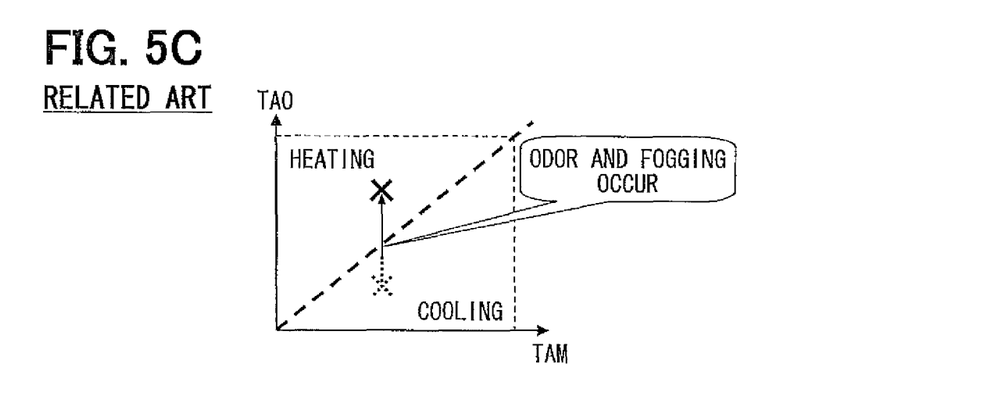
FIG. 5C is a diagram showing a state in which the target outlet temperature TAO increases after the turning OFF of the defroster switch shown in FIG. 5B.

Because the target outlet temperature TAO is increased by the decrease of the temperature in the vehicle compartment, the refrigerant cycle is switched from the cooling circuit to the heating circuit as shown in FIG. 5C. In the process of the switching of the refrigerant cycle from the cooling circuit to the heating circuit in the comparative example, bad odor and water vapor generated from the surface of the cooling heat exchange may be blown into the vehicle compartment with conditioned air. Accordingly, in the comparative example, the user may feel bad odor, and a windshield may be fogged.

As described above, in the exemplar embodiment, the defrosting operation shown in steps S3 to S9 is performed. Thus, a capacity of the air conditioner 100 for removing fog of the windshield can be ensured, and visibility through the windshield can be thereby improved.

At step S15, as described above, the air conditioning controller 40 is capable of determining the refrigerant cycle between the cooling circuit and the heating circuit based on the present outside temperature TAM so that a present temperature of air blown into the vehicle compartment becomes the target outlet temperature TAO. The determination of the refrigerant cycle at step S15 is performed after the predetermined time period TP has passed since the stop of the defrosting operation. During the time period TP, the air conditioning controller 40 performs the ventilation operation, in which outside air is introduced into the duct 1 and the compressor 20 is not in operation.

When the defroster switch 42 is turned ON, and when the refrigerant cycle is the heating circuit at step S8, a temperature of air flowing through the defroster air outlet DEF is increased at step S9, and the refrigerant cycle is maintained at a state of the heating circuit. When the refrigerant cycle is the cooling circuit at step S8, the fog removing is performed with the refrigerant cycle kept at a state of the cooling circuit. Therefore, an effect of the fog removing can be improved by preventing the refrigerant cycle from being switched during the defroster mode.

As shown in step S10, when the user changes the preset temperature TSET during the defrosting operation, the air conditioner controller 40 may switch the refrigerant cycle between the cooling circuit and the heating circuit based on the changed preset temperature TSET.

After the stop of the defrosting operation, at step S12, the air conditioning controller 40 determines whether the predetermined time period TP has passed. Subsequently, depending on the determination at step S12, the air conditioning controller 40 determines a state of the compressor 20 or determines the refrigerant cycle between the cooling circuit and the heating circuit.

Figure 4B:
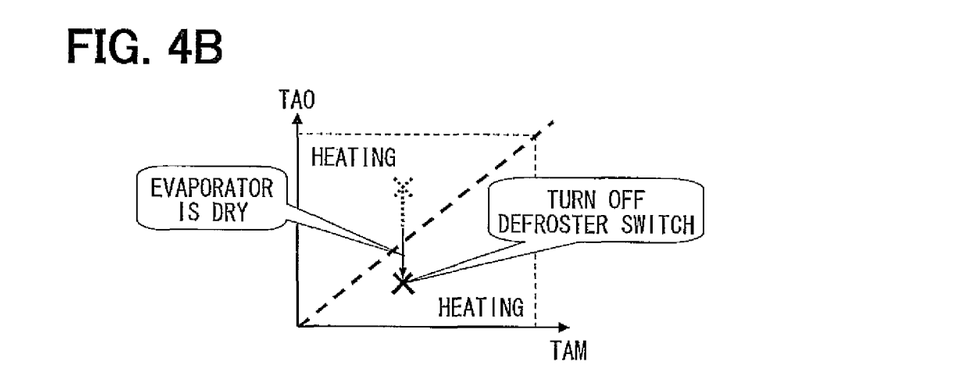
FIG. 4B is a diagram showing a state in which a target outlet temperature TAO decreases, and the defroster switch is turned OFF when the target outlet temperature TAO is lower than an outside temperature TAM, after the turning ON of the defroster switch shown in FIG. 4A.
Figure 4C:
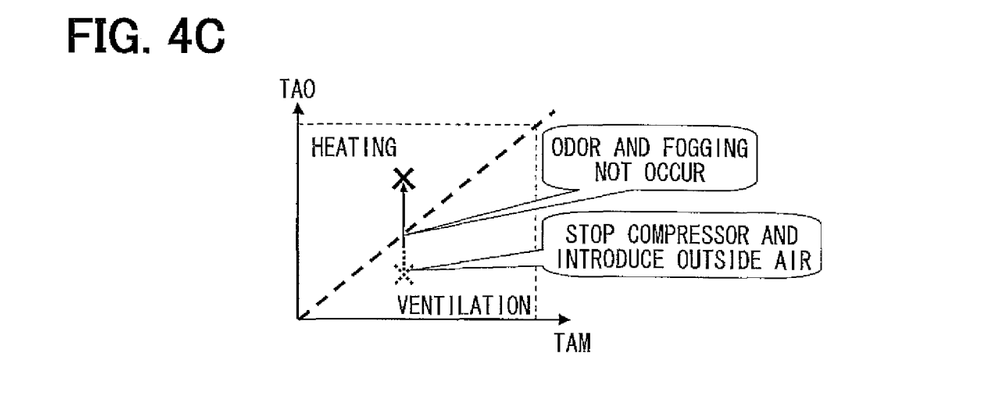
FIG. 4C is a diagram showing a state in which the target outlet temperature TAO increases during a ventilation operation of the air conditioner after the turning OFF of the defroster switch shown in FIG. 4B.

The present state in the map may move across the diagonal dash line during the defrosting operation as shown by the arrow in FIG. 4B. However, during the defrosting operation, the refrigerant cycle can be kept at a state selected before the defrosting operation is performed. Immediately after the stop of the defrosting operation, the refrigerant cycle is not determined based on the target outlet temperature TAO and the outside temperature TAM similarly to the determination at step S15 even when the present state in the map has moved across the diagonal dash line during the defrosting operation. The compressor 20 is stopped for the predetermined time period TP immediately after the stop of the defrosting operation in order to perform the ventilation operation in which outside air is introduced into the vehicle compartment. By performing the ventilation operation, a present state of the vehicle compartment can be maintained, as long as possible, at a state that is before the performing of the defrosting operation.

When the predetermined time period TP has passed after the stop of the defrosting operation, the air conditioning controller 40 determines the refrigerant cycle between the heating circuit and the cooling circuit based on the target outlet temperature TAO and the outside temperature TAM by using the map shown in FIG. 3, so that a temperature of air blown into the vehicle compartment becomes the target outlet temperature TAO.

Thus, as described above, the air conditioning controller 40 is capable of controlling the refrigerant cycle regardless of the target outlet temperature TAO and the outside temperature TAM temporarily, and is capable of changing the temporary refrigerant cycle control to a general refrigerant cycle control in which the refrigerant cycle is determined based on the target outlet temperature TAO and the outside temperature TAM by using the map shown in FIG. 3. Moreover, because the compressor 20 is stopped in the ventilation operation at step S14 in FIG. 2, consumption energy of the air conditioner 100 can be reduced.

Although the present disclosure has been fully described in connection with the exemplar embodiment thereof with reference to the accompanying drawings, it is to be noted that various changes and modifications will become apparent to those skilled in the art.

Figure 6:
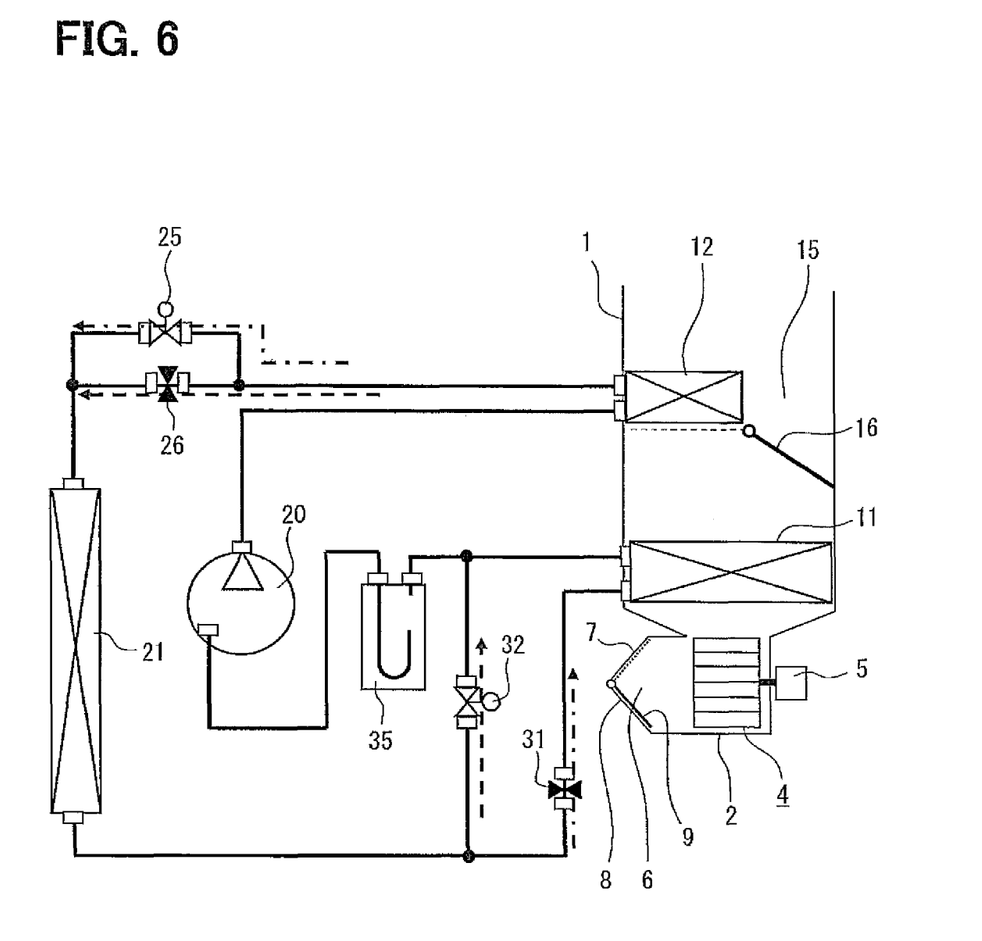
FIG. 6 is a schematic diagram showing an air conditioner for a vehicle, according to a modification of the present disclosure.

A refrigerant cycle having at least a heating circuit and a cooling circuit may be used as the refrigerant cycle described in the above exemplar embodiment. For example, a refrigerant cycle shown in FIG. 6 may be used as the refrigerant cycle of the above-described exemplar embodiment. The refrigerant cycle in FIG. 6 includes an electromagnetic valve 32 as an example of the cycle switching device instead of the three-way valve 30 described in the exemplar embodiment, and the electromagnetic valve 32 is opened or closed to switch the refrigerant cycle between the heating circuit and the cooling circuit.

In the above-described exemplar embodiment, when the defroster switch 42 is turned ON, the mode switch is set to be the defroster mode. However, a push-button defroster switch may be provided in addition to the mode switch. In this case, the defrosting operation can be performed by operating the mode switch or by turning ON the push-button defroster switch, and operability of the air conditioner 100 to remove fog of the windshield in an emergency can be thereby improved.

Additional advantages and modifications will readily occur to those skilled in the art. The disclosure in its broader terms is therefore not limited to the specific details, representative apparatus, and illustrative examples shown and described.

What is claimed is:

1. An air conditioner for a vehicle, comprising:
a heating heat exchanger and a cooling heat exchanger which are accommodated in a duct;
a cycle switching device which switches a refrigerant cycle, through which refrigerant circulates, between a heating circuit, in which refrigerant flows through the heating heat exchanger to heat air blown into a vehicle compartment, and a cooling circuit, in which refrigerant flows through the cooling heat exchanger to cool air blown into the vehicle compartment;
a plurality of air outlets through which air in the duct is blown into the vehicle compartment;
an air conditioning controller which controls the cycle switching device;
a defroster switch operative to command the air conditioning controller to perform a defrosting operation in which air is blown out of the duct toward a windshield of the vehicle through a defroster air outlet of the plurality of air outlets; and
a ventilation-mode performing portion configured to limit a flow amount of refrigerant flowing through the cooling heat exchanger and to blow outside air through the cooling heat exchanger into the vehicle compartment from the defroster air outlet for a predetermined time period immediately after an end of the defrosting operation, wherein
the air conditioning controller includes a defroster control portion configured to increase a temperature of air blown into the vehicle compartment through the defroster air outlet by a predetermined degree while keeping the refrigerant cycle at a state of the heating circuit during the defrosting operation until the end of the defrosting operation and for the predetermined time period immediately after the end of the defrosting operation.

2. The air conditioner according to claim 1, further comprising a heating circuit change portion configured to stop preventing the refrigerant cycle from being changed from the state of the heating circuit when a temperature in the vehicle compartment is reduced by a user during the defrosting operation.

3. The air conditioner according to claim 1, further comprising:
a circuit determination portion configured to determine the refrigerant cycle between the heating circuit and the cooling circuit; and a circuit restart portion configured to stop the limitation of the flow amount of refrigerant flowing through the cooling heat exchanger, and to perform an air conditioning operation based on the refrigerant cycle determined by the circuit determination portion, when the predetermined time period has passed after the stop of the defrosting operation.

4. The air conditioner according to claim 1, further comprising:
a compressor that discharges the refrigerant in the refrigerant cycle; and
wherein the ventilation-mode performing portion is configured to limit the flow amount of refrigerant flowing through the cooling heat exchanger by stopping the compressor.

5. An air conditioner for a vehicle, comprising:
a duct through which air is blown into a vehicle compartment by a blower;
a heating heat exchanger accommodated in the duct and arranged in a refrigerant cycle, through which refrigerant circulates, to heat air by heat exchange with refrigerant flowing through the heating heat exchanger;
a cooling heat exchanger accommodated in the duct and arranged in the refrigerant cycle to cool air by heat exchange with refrigerant flowing through the cooling heat exchanger;
a cycle switching device which switches the refrigerant cycle between a heating circuit and a cooling circuit to heat or cool air;
a defroster air outlet arranged at a downstream side of the duct in the air flow direction, the defroster air outlet being a port through which air is blown out of the duct into the vehicle compartment toward an inner surface of a windshield of the vehicle;
a defroster switch operative to command to perform a defrosting operation in which air is blown out of the duct through the defroster air outlet; and
an air conditioning controller including:
a circuit keeping portion configured to keep the refrigerant cycle during the defrosting operation;
a ventilation-mode performing portion configured to limit a flow amount of refrigerant flowing through the cooling heat exchanger and to blow outside air through the cooling heat exchanger into the vehicle compartment from the defroster air outlet for a predetermined time period immediately after an end of the defrosting operation; and
a defroster control portion configured to increase a temperature of air blown into the vehicle compartment through the defroster air outlet by a predetermined degree while keeping the refrigerant cycle at a state of the heating circuit during the defrosting operation until the end of the defrosting operation and for the predetermined time period immediately after the end of the defrosting operation.

6. The air conditioner according to claim 5, further comprising
a temperature setting switch operative to determine a preset temperature of the vehicle compartment, wherein
the air conditioning controller further includes a heating circuit change portion configured to change the refrigerant cycle kept by the circuit keeping portion during the defrosting operation, when the preset temperature is changed by an operation of the temperature setting switch.

7. The air conditioner according to claim 5, wherein the air conditioning controller further includes:
a circuit determination portion configured to determine the refrigerant cycle between the heating circuit and the cooling circuit; and
a circuit restart portion configured to stop the limitation of the flow amount of refrigerant flowing through the cooling heat exchanger, and to perform an air conditioning operation based on the refrigerant cycle determined by the circuit determination portion, when the predetermined time period has passed after the stop of the defrosting operation.

* * * * *